United States Patent [19]

Piotrowski

[11] Patent Number: 4,529,255
[45] Date of Patent: Jul. 16, 1985

[54] MACHINE TOOL WAY DAMPER

[75] Inventor: Tadeusz W. Piotrowski, Cincinnati, Ohio

[73] Assignee: Cincinnati Milacron Inc., Cincinnati, Ohio

[21] Appl. No.: 502,306

[22] Filed: Jun. 8, 1983

[51] Int. Cl.³ .................. F16C 29/00; F16C 29/06; F16C 27/00
[52] U.S. Cl. ..................... 308/3 A; 308/6 C; 384/99
[58] Field of Search ............. 308/3 R, 3 A, 3 C, 3.5, 308/5 R, 6 R, 6 C; 409/141; 248/657; 384/99

[56] References Cited

U.S. PATENT DOCUMENTS

| | | | |
|---|---|---|---|
| 3,020,097 | 2/1962 | Bullard et al. | 308/3 R |
| 3,656,818 | 4/1972 | Bischoff et al. | 308/3 R |
| 3,673,918 | 7/1972 | Zankl | 308/3 A X |
| 4,444,534 | 4/1984 | Bergman | 308/6 C |

FOREIGN PATENT DOCUMENTS 522940  8/1976  U.S.S.R. .............................. 308/5 R

Primary Examiner—Stuart S. Levy
Assistant Examiner—Thomas R. Hannon
Attorney, Agent, or Firm—Thomas M. Farrell

[57] ABSTRACT

In a machine tool having cooperating first and second slides slidably with respect to one another, an improved way damper has a damper plate carried by the first slide in slidable engagement with the second slide, and the plate is retained so as to permit slight movement of the plate in a normal direction to the movement of the first and second slides. A sealed damping chamber is formed between the damper plate and the first slide, having a viscous medium within the chamber which effects squeeze film damping as the damper plate and first slide undergo relative vibratory motion. An alternate embodiment employs a visco-elastic medium in the damping chamber to effect damping.

6 Claims, 9 Drawing Figures

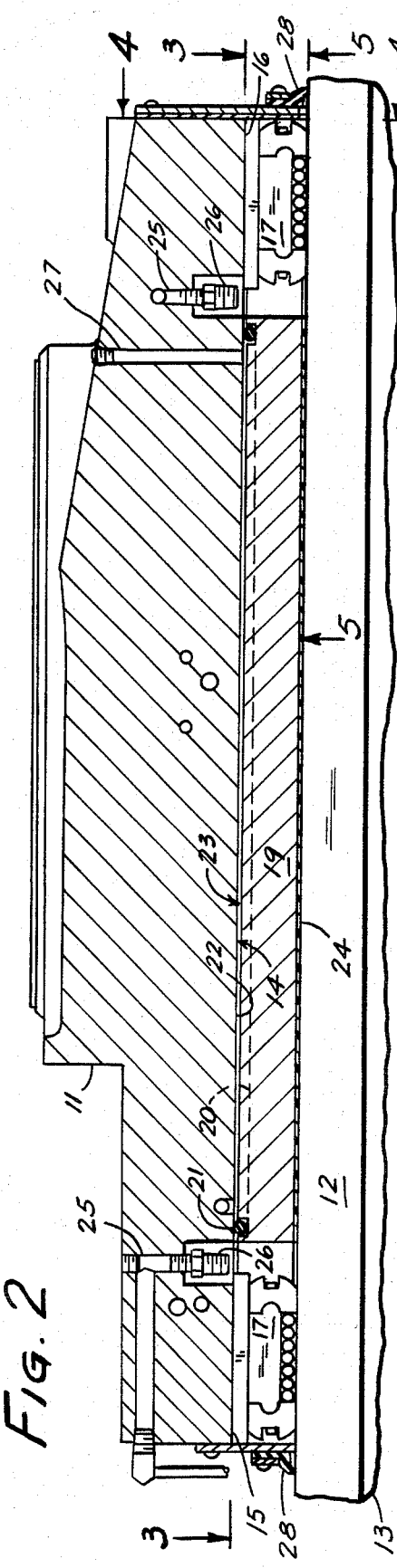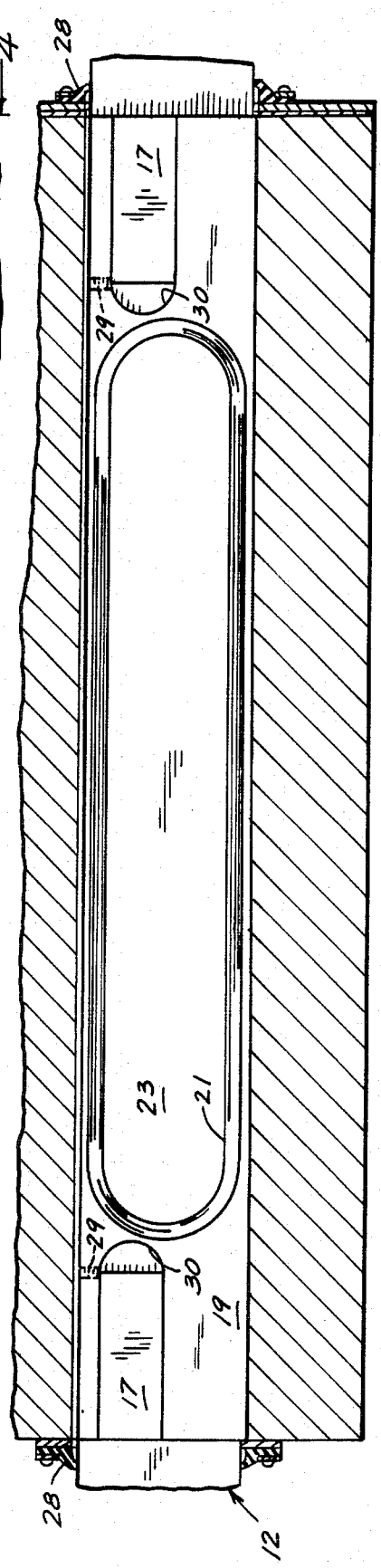
FIG. 2
FIG. 3

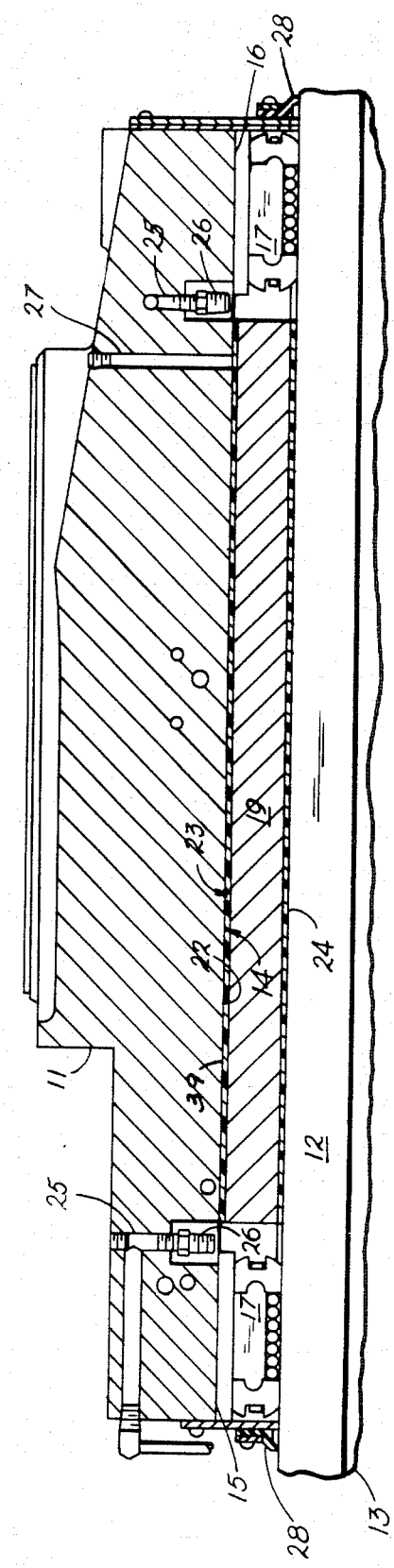

MACHINE TOOL WAY DAMPER

BACKGROUND OF THE INVENTION

The invention relates generally to damping elements for controlling machine vibrations and for improving dynamic stiffness of a machine tool. In particular, the invention relates to an apparatus for damping machine vibrations by means of a way damper applied at the interface of machine slides.

Machine tool systems are generally comprised of elements which comprise a spring-mass-damper arrangement, the parameters of which effect excitation amplitudes and frequencies of generated vibrations. As a means of controlling the vibrations, designers have generally sought to alter the spring-mass-damper elements one-by-one or in combination to shift or change the vibration characteristics. The most generally applied prior art device has been a mass damper block which is secured to either a movable or stationary element of a machine structure, wherein the damper block is typically mounted through spring supports and suitable fasteners. A drawback of the prior art damper block arrangement is that the additional mass must be physically accomodated by the machine envelope, which may possibly result in unwanted intrusions of usable machine space, and further, the mass must be often propelled with machine slides, thus creating important design considerations for the feed mechanisms which may be employed.

Applicant has obviated the difficulties inherent in the prior art arrangement by means of a novel machine way damper which is applied at the slide interface zone to create an overall compact design, and an effective solution for influencing the dynamic stiffness of a machine tool in a desired manner.

SUMMARY OF THE INVENTION

The invention is shown embodied in a machine tool having first and second relatively movable slides wherein a damper plate is fitted between the two slides and is carried in slidable engagement with the second slide by the first slide element. A damping chamber or space is formed between the damper plate and the first slide, and seal means are provided for containing a viscous damping medium in the damping chamber, while the damper plate is permitted to reverse movement under influence of vibratory forces, so that a small amount of damper plate movement may be accomodated in a normal direction between the first and second slides when the slides are stationary or are relatively moving. The viscous damping medium thereby effects squeeze film damping as said damper plate and the first slide undergo relative vibratory motion.

In an alternate embodiment, a visco-elastic material is placed in the damping chamber to dampen the vibration.

BRIEF DESCRIPTION OF THE DRAWINGS

FIG. 2 is a section through the slideway taken along the lines 2—2 of FIG. 1.

FIG. 3 is a plan section through the slide taken along the line 3—3 of FIG. 2.

FIG. 7 is a section of FIG. 4 depicting an alternate embodiment.

DESCRIPTION OF THE PREFERRED EMBODIMENT

Figure 1:
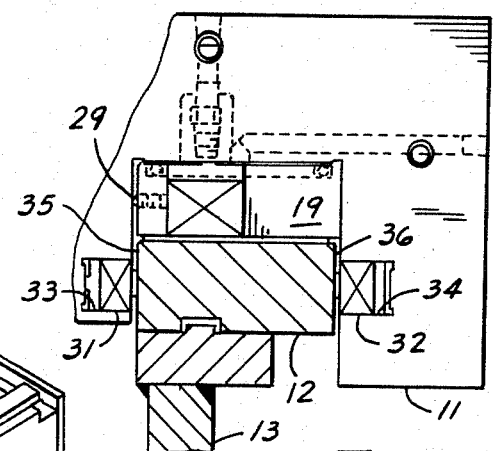
FIG. 1 is a perspective view of a machine tool employing the present invention.

Referring to FIG. 1, there is shown a machine tool 10 having a variety of machine tool slides movable on suitable ways and, in particular, one typical slide 11 is that of the horizontal table carried on horizontal ways 12 of the base element 13. The slideways 12 may be considered as secondary slides relatively movable with respect to the slide 11. FIG. 2 delineates a section through the slideway 12 of FIG. 1, illustrating that the base way 12 supports the slideable or movable machine slide 11 which is configured as a metal casting having a channel 14 machined throughout its length, to cooperate with the slideway 12. At opposite ends 15, 16 of the channel 14 within the machine slide 11 are carried support elements, which are recirculating roller bearings 17 well-known in the art, and which present a forwardly spaced, lineal row of rollers that are maintained in antifriction bidirectional rolling engagement with the rectilinear slideway 12, and are typically available under one brand name as TYCHOWAY roller bearings. The roller bearing 17 is secured to the movable slide 11 by friction, and serves to carry the principal load of the slide 11 in an antifriction manner. The central portion of the channel 14 houses a damper plate 19 which is an elongate metal bar, rectangular in cross-section, and is dimensioned in thickness to be less than the total channel depth when measured relative to the support way 12. The damper plate 19 has a groove 20 containing an O-ring 21 sealing at the interface of the upper channel surface 22 of the slide 11 to form a thin damping chamber 23 between the two 19, 11. For squeeze film damping, the damping chamber 23 should be thin in the direction of the plate movement, e.g., in the general range of 0.0005 to 0.025 inches. The damper plate 19 rides against the support way 12, and is coated with a thin surface 24 of low-friction material, such as TEFLON fluorocarbon plastic. The damper plate 21 is free to move in a vertical direction relative to the support way 12 and the slide 11 under the influence of machine vibrations, but is closely fitted in the channel 14 and held fixed relative to the slide 11 in a longitudinal direction so that the damper plate 19 will be carried along with the slide 11 during its excursion. The slide 11 is fitted with internal ports 25 and atomizing nozzles 26 to provide an oil mist lubrication to the antifriction roller bearings 17, and a filler hole 27 is provided through the slide 11, connecting to the damping chamber 23, so that a viscous damping medium such as a thick grease or oil may be ported into the damping chamber 23. The heavy weight of the damping plate 19 causes it to be biased in a downward direction, in intimate contact with the support way 12. However, it may be appreciated that in other assemblies, a spring or other biasing element may be provided between the damper plate 19 and the slide 11 when the force of gravity is not usable for the purpose, as in the case of a relatively lightweight damper plate or a plate carried on a non-horizontal slide. In some instances, it may be preferable to dimension the channel 14 so that the O-ring 21 is compressed as an elastomeric spring in assembly, thus performing two functions: (a) sealing the damping chamber 23, and; (b) spring-biasing the damper plate 19 against the slideway 12. Way seals 28 are provided at each end 15,16 of the slide channel 14 to wipe contaminants from the support way 12 as the slide 11 is moved.

The plan section of FIG. 3 shows that the damper plate 19 is carried along the full length of the channel 14. The damper plate 19 is secured snuggly to the slide 11 by a pair of set screws 29 provided through the sides of the damper plate 19 for assembly purposes, and the screws 29 are backed off when the plate 19 is in operation. At each end of the damper plate 19 a slot 30 is machined to provide clearance around the recirculating roller bearing 17 and to carry the plate 19 when the slide 11 is moving. The seal groove 20 is depicted as an oval track in the damper plate 19, containing the O-ring seal 21 which forms the damping chamber 23.

Figure 4:
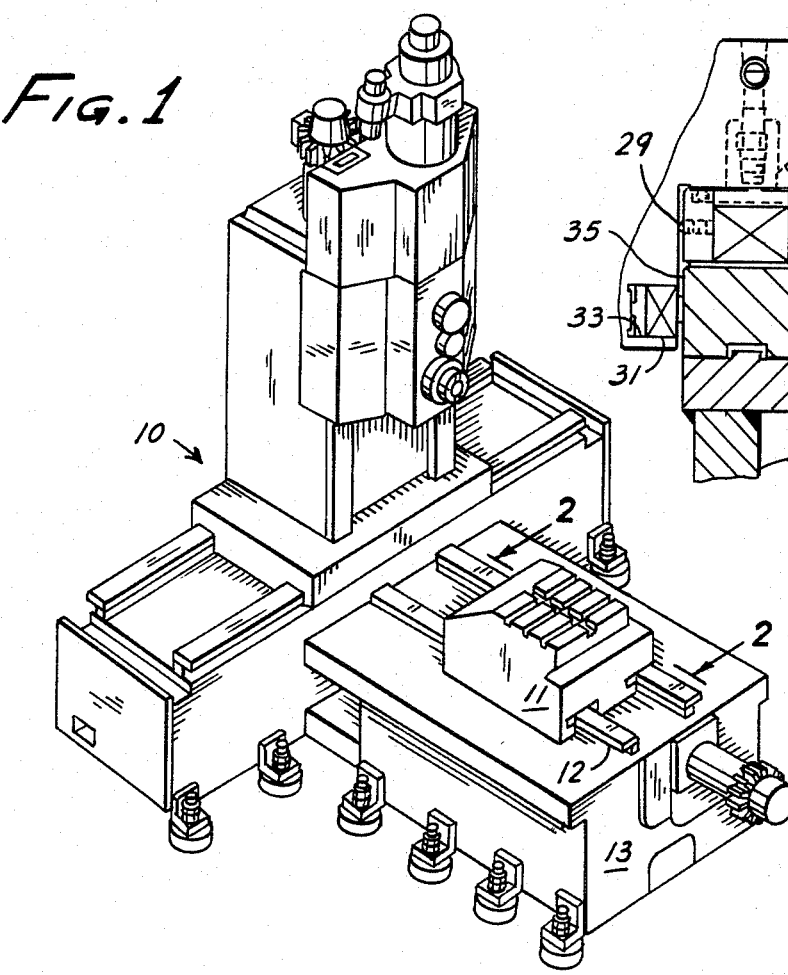
FIG. 4 is an elevational section through the slideway taken along the line 4—4 of FIG. 2.

The end view of FIG. 4 shows the slide 11 configured around the support way 12 of the machine base 13, and further shows that side recirculating rollers 31, 32 are provided in suitable receptor slots 33, 34, to bear against the sides 35, 36, of the rectangular way 12. The assembly set screw 29 is shown in the side of the damper plate 19.

Figure 5:
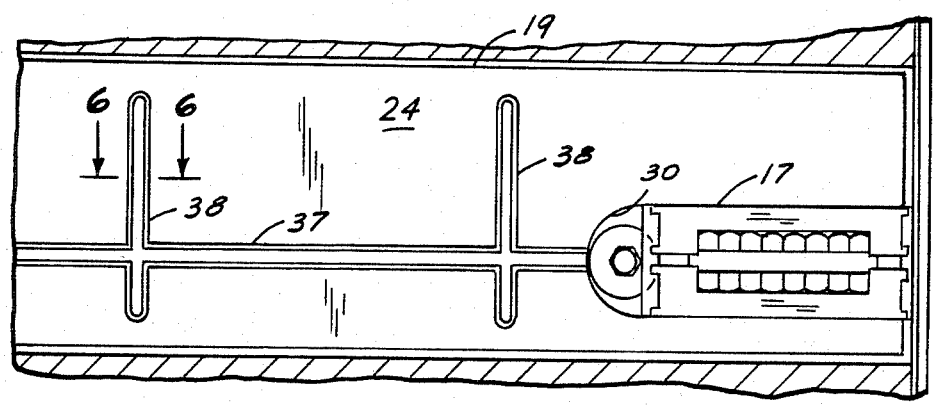
FIG. 5 is a bottom view of the slideway damper plate taken along the line 5—5 of FIG. 2.
Figure 6:
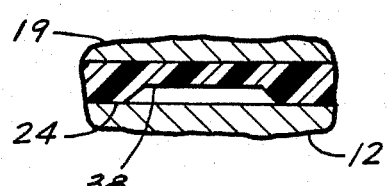
FIG. 6 is a section through the groove of the damper plate taken along the line 6—6 of FIG. 5.

FIG. 5 depicts a bottom view of the damper plate 19, illustrating the clearance slot 30 around the recirculating roller bearing 17, and further illustrating that a series of "chicken ladder" oil grooves 37, 38, are machined into the Teflon surface 24 of the damper plate 19 to provide pockets for lubrication. A typical cross-section through the oil grooves 37, 38 is shown in FIG. 6.

Therefore, as vibratory forces are seen by the slide 11 which is carried on the antifriction roller bearings 17, any relative movement between the slide, damper plate, and support way, will cause the vibratory forces to be attenuated by the phenomenon of squeeze-film damping of the viscous damping medium within the damping chamber 23, thereby improving overall dynamic stiffness of the machine 10.

An alternate embodiment is shown in FIG. 7. A visco-elastic damping material 39, such as PVC (polyvinyl chloride), is substituted in the damping chamber for the viscous medium. This type of material has the characteristic of being able to dissipate energy when displaced. The visco-elastic materials used in damping units behave quite definitely in an elastic manner up to some stress limit, but once that stress is exceeded, it flows until its area increases and stresses go down until it becomes elastic again.

Strictly considered, in a damper designed for squeeze film, the direct substitution of a visco-elastic material would result in somewhat less damping of the structure, but this may be suitable for some applications. The visco-elastic materials can have a damping capability 20 times that of rubber, but the squeeze film damper can possess a damping capability three or four times that of the visco-elastic damper.

Figure 8:
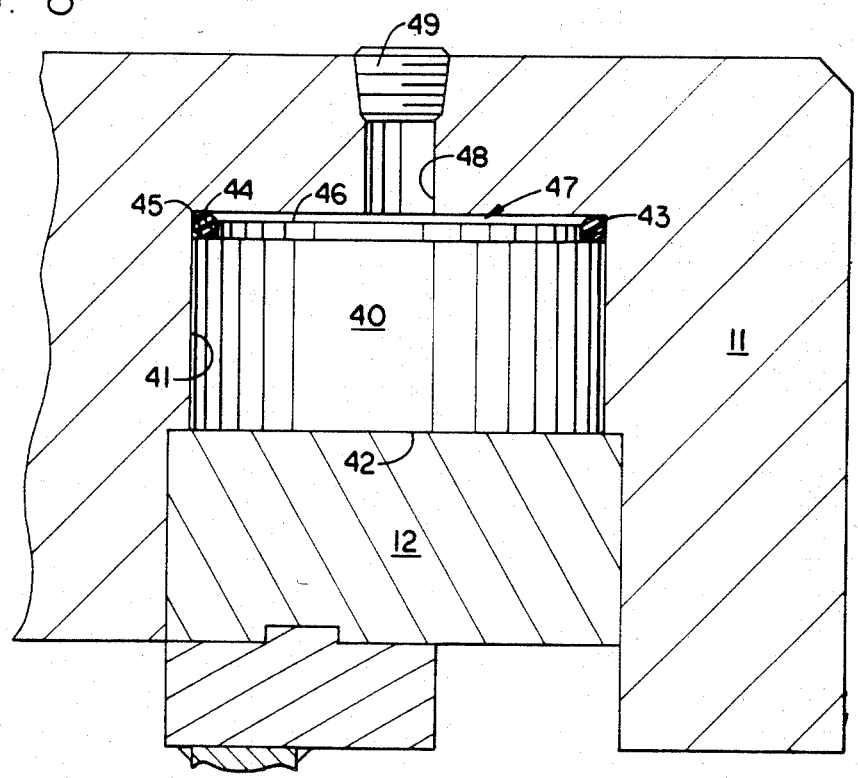
FIG. 8 is an elevational section through an alternate embodiment.
Figure 9:
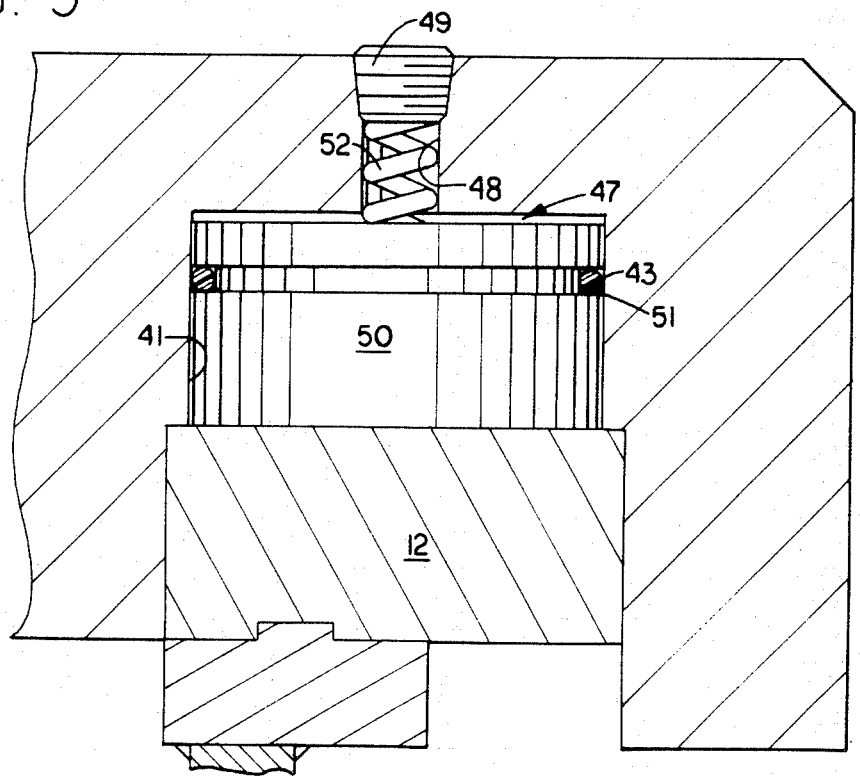
FIG. 9 is an elevational section through an alternate embodiment.

Other alternate embodiments are shown in FIGS. 8 and 9. FIG. 8 shows the slide 11 supported by the slideway 12, and a circular damper plate 40 is located in a close-fitting bore 41 in the slide 11. The bottom surface 42 of the plate 40 is biased into engagement with the sliding 12 by an O-ring 43, which is carried on a circular diameter 44 and adjacent shoulder 45 machined at the top end 46 of the plate 40. The thickness of the plate 40 and the depth of the bore 41 are dimensioned to maintain a thin damping chamber 47 between the two 40, 11. The shoulder 45 is dimensioned so that the O-ring 43 will be compressibly held in position, thereby sealing the damping chamber 47 and behaving as an elastomeric spring for biasing the plate 40. A filler hole 48 and pipe plug 49 are provided in the slide 11 so that a viscous damping medium such as thick grease or oil may be introduced into the damping chamber 40.

FIG. 9 depicts a circular damper plate 50 placed in the bore 41 of FIG. 8, except that the O-ring 43 is provided in an annular groove 51 around the plate 50 for sealing purposes only. A helical compression spring 52 is located in the filler hole 48 and preloaded by the pipe plug 49 against the damper plate 50 for biasing the plate 50 against the slideway 12 after a viscous medium is introduced into the damping chamber 47.

A grease fitting or the like may be substituted for the pipe plug 49 of FIGS. 8 and 9.

Further, the viscous medium in the damping chamber 47 may be pressurized to a point above the atmospheric or ambient pressure to provide a biasing force on the damper plate 40, 50.

It may be appreciated that a visco-elastic element (not shown) may be substituted for the viscous medium in the damping chamber, for certain applications.

The invention is not limited to the specific embodiments shown herein, however, but rather encompasses all such designs and modifications as come within the scope of the appended claims.

What is claimed is:

1. In a tool having first and second cooperating slides slidably movable with respect to one another, an improved way damper apparatus for damping vibrations, wherein the improvement comprises:
    (a) a damper plate carried by said first slide, said plate having anti-friction surface means in slidable engagement with said second slide;
    (b) means for relatively moving said plate and first slide in unison with respect to said second slide and for permitting reversing movement of said damper plate in a direction substantially normal to slide movement between said first and second slides while said slides are relatively moving;
    (c) means for defining a damping chamber between said damper plate and said first slide; and
    (d) a damping medium in said damping chamber, said means for defining a damping chamber being such that said damping medium in said chamber effectuates damping in the damping chamber as said damper plate and first slide undergo relative vibratory motion.

2. The way damper apparatus of claim 1 wherein the dimension of said chamber normal to said damper plate and first slide in unvibrated assembly with said second slide is in the range of 0.0005 inches to 0.025 inches.

3. The way damper apparatus of claim 1, wherein said damping medium comprises a viscous damping medium.

4. The way damper apparatus of claim 1, wherein said damping medium comprises a visco-elastic element.

5. In a tool having first and second cooperating slides slidably movable with respect to one another, an improved way damper apparatus for damping vibrations, wherein the improvement comprises:

(a) a damper plate carried by said first slide, said plate having anti-friction surface means in slidable engagement with said second slide;
(b) means for relatively moving said plate and first slide in unison with respect to said second slide and for permitting reversing movement of said damper plate in a direction for substantially normal to slide movement between said first and second slides, while said slides are relatively moving;
(c) means for defining a damping chamber between said damper plate and first slide, wherein the dimension of said chamber normal to said damper plate and said first slide in unvibrated assembly with said second slide is in the range of 0.0005 inches to 0.025 inches; and
(d) a viscous damping medium in said damping chamber, said means for defining a damping chamber being such that said damping medium in said chamber effectuates squeeze film damping in the damping chamber as said damper plate and first slide undergo relative vibratory motion.

6. In a tool having first and second cooperating slides slidably movable with respect to one another, an improved way damper apparatus for damping vibrations, wherein the improvement comprises:
(a) a damper plate carried by said first slide, said plate having anti-friction surface means in slidable engagement with said second slide;
(b) means for relatively moving said plate and first slide in unison with respect to said second slide and for permitting reversing movement of said damper plate in a direction substantially normal to slide movement between said first and second slides, while said slides are relatively moving;
(c) means for defining a damping chamber between said damper plate and said first slide; and
(d) a visco-elastic damping medium in said damping chamber, said means for defining a damping chamber being such that said damping medium in said chamber effectuates damping in the damping chamber as said damper plate and first slide undergo relative vibratory motion.

* * * * *